United States Patent [19]

Herbst

[11] Patent Number: 4,972,429

[45] Date of Patent: Nov. 20, 1990

[54] ACHROMATIC PRISM BEAM EXPANDER FOR HIGH MAGNIFICATION AND TUNABLE LASER USING SAME

[75] Inventor: Richard L. Herbst, Palo Alto, Calif.

[73] Assignee: Spectra-Physics, Inc., Mountain View, Calif.

[21] Appl. No.: 273,228

[22] Filed: Nov. 18, 1988

[51] Int. Cl.$^5$ .............................................. H01L 3/00
[52] U.S. Cl. .................................. 372/100; 350/286; 350/421
[58] Field of Search ................ 350/421, 286; 372/102, 372/100

[56] References Cited

U.S. PATENT DOCUMENTS

| | | | |
|---|---|---|---|
| 4,016,504 | 4/1977 | Klauminzer | 372/102 |
| 4,127,828 | 11/1978 | Klauminzer | 372/102 |
| 4,255,718 | 3/1981 | Herbst | 372/53 |

OTHER PUBLICATIONS

Besse, Arthur L., "Expansion of Laser Beam in Only One Dimension", *Applied Optics*, vol. 7, No. 11, Nov., 1968, p. 2322.

Houston, Jr., Joseph B., "Optical Systems Manufacturing Technology", *Optical Engineering*, vol. 13, No. 4, July, 1974, pp. 6160–6161.

Trebino, "The Achromatic N-Prism Beam Expander: Optical Configurations", Oct., 1984, Submitted to Applied Optics.

Klauminzer Conference Paper Abstract, "New High Performance Short Cavity Dye Laser Design", P.D. #18, June 1–3, 1977, Washington, D.C.

*Primary Examiner*—James W. Davie
*Attorney, Agent, or Firm*—Fliesler, Dubb, Meyer & Lovejoy

[57] ABSTRACT

A prism beam expander in which the incoming beam is essentially achromatically expanded by 100–500 times in one dimension with transmission through the prism beam expander exceeding 40%. In addition, the input beam is nearly collinear with the output beam. The prism beam expander includes 6 prisms in a preferred system, at least 2 of the apexes of which are oriented on the first side of the optical path while at least 2 of the apexes of the remaining prisms are oriented on the second side of the optical path. The achromatic, high-magnification collinear prism beam expander is used in a tunable laser achieving very narrow linewidths.

12 Claims, 8 Drawing Sheets

ACHROMATIC PRISM BEAM EXPANDER FOR HIGH MAGNIFICATION AND TUNABLE LASER USING SAME

BACKGROUND OF THE INVENTION

1. Field of the Invention

The present invention relates to prism beam expanders commonly used for magnification in one dimension of laser beams, and more particularly to achromatic prism beam expanders with very high magnifications in lasers using diffraction gratings as narrow line width reflectors.

2. Description of Related Art

The prism beam expander (PBE) has been in wide spread use in laser related applications that require expansion or contraction of a laser beam in one dimension. Using a PBE, a round laser beam can be transformed into an elliptical laser beam. For instance, in a common application of the PBE, it is used to expand a laser beam in a dimension orthogonal to the lines in a grating prior to diffraction of the beam by the grating. This expansion prior to diffraction by a grating in tunable lasers significantly improves laser linewidth at a small cost in laser efficiency. Also, the prism beam expander is simple to align as compared to other methods for expanding laser beams.

Application of prism beam expanders in lasers is illustrated in U.S. Pat. No. 4,016,504 entitled OPTICAL BEAM EXPANDER FOR DYE LASER; Inventor: Klauminzer, issued Apr. 5, 1977, and U.S. Pat. No. 4,255,718 entitled TRANSVERSELY PUMPED DYE LASER HAVING IMPROVED CONVERSION EFFICIENCY; Inventor: Herbst, issued Mar. 10, 1981.

In the prior art, the magnification achieved by prism beam expanders has been limited to in the neighborhood of 50 times. This limited magnification has been a constraining factor on the laser linewidth in tunable lasers using diffraction gratings.

Because of this limit in magnification in prior art prism beam expanders, the manufacturers of tunable lasers that require very narrow linewidths have been creating complicated laser cavity designs, such as the "grazing incidence grating dye laser". These complicated cavity designs lead to alignment difficulties in manufacture that are undesirable.

Another feature of prism beam expanders that is desirable for many laser related applications is achromaticity. The design of achromatic prism beam expanders has been addressed in detail in the prior art. See Trebino, "The Achromatic N-Prism Beam Expander: Optical Configurations" dated October 1984, submitted to Applied Optics. The Trebino paper describes the design of achromatic prism beam expanders with maximized transmission characteristics. According to Trebino, a high magnification prism beam expander that is achromatic should be configured with all apex angles oriented on a first side (labelled up U) of an optical path with the last apex angle oriented on the opposite side (labelled down D) of the optical path (UUU...UD). Trebino concludes that this design should be applied for all prism beam expanders with magnifications greater than $(2-1/(2^{N-1}-1))^N$, where N is equal to the number of prisms in the PBE. Thus a 6 prism expander with magnification greater than 60 should use the UUUUUD configuration according to Trebino. The recommended configuration of Trebino suffers the disadvantage that the input beam and the output beam are misaligned substantially. This complicates manufacture of optical devices relying on the prism beam expander due to the irregular beam angles resulting from passing through this PBE configuration.

It is desirable, as illustrated in the Herbst reference cited above, to have an input beam to the PBE nearly collinear with the output beam of the PBE.

In summary, according to the prior art, achromatic prism beam expanders are useful for applications requiring magnification much less than 100 times, and to manufacture higher magnification PBEs, an awkward configuration and large numbers of prisms would be required. It is desirable, however, to achieve very high magnifications in achromatic PBEs with nearly collinear input and output beams for many applications.

SUMMARY OF THE INVENTION

The present invention provides a prism beam expander in which the incoming beam is essentially achromatically expanded by more than 100 times in one dimension with good transmission. In addition, the input beam is nearly collinear with the output beam. Achromaticity is achieved with a variation in the absolute output angle of less than 60 microradians over a wide wavelength range.

Prisms are characterized by an apex at which an incidence and an exit face of each prism intersect to define an apex angle. The apexes of the prisms are oriented on either a first side or a second side of the optical path through the prism beam expander. According to one aspect of the present invention, the prism beam expander includes 6 prisms, at least 2 of the apexes of which are oriented on the first side of the optical path while at least 2 of the apexes of the remaining prisms are oriented on the second side of the optical path.

According to another aspect of the present invention, a laser is provided comprising a diffraction grating, a prism beam expander with magnification orthogonal to the lines of the grating of greater than 100 times, and a laser medium in which the medium, prism beam expander, and grating are aligned along a nearly collinear optical path.

Therefore, in spite of prior art suggesting that useful beam expanders are limited to low magnifications, the present invention provides in an illustrated embodiment, an achromatic prism beam expander with a magnification of 500 times in a preferred embodiment with nearly collinear input and output.

DETAILED DESCRIPTION

A detailed description of the preferred embodiments of the present invention is provided with reference to the Figures.

Figure 1:
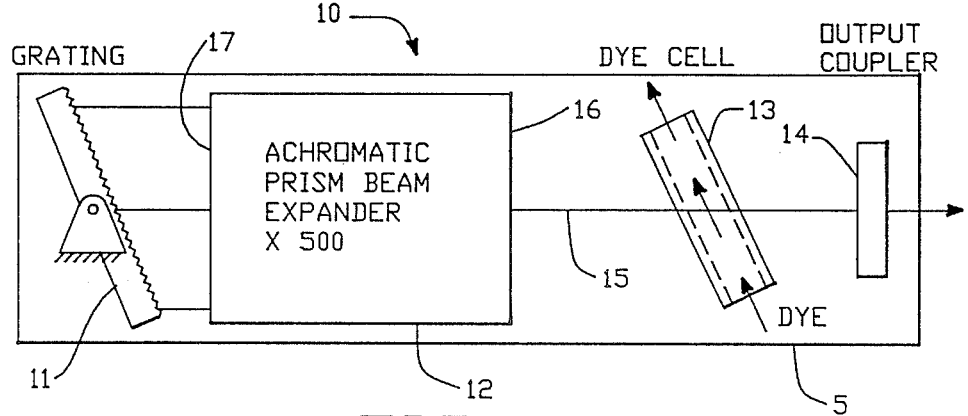
FIG. 1 is a schematic diagram of a dye laser utilizing the prism beam expander of the present invention.

With reference to FIG. 1, a tunable dye laser with a prism beam expander according to the present invention is described.

Figure 2A:
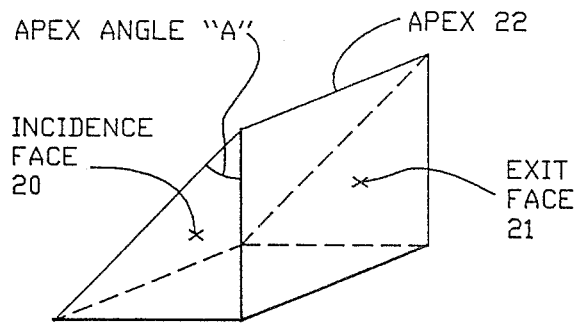
FIGS. 2A and 2B illustrate the geometry of a prism referred to in the description of the present invention.
Figure 2B:
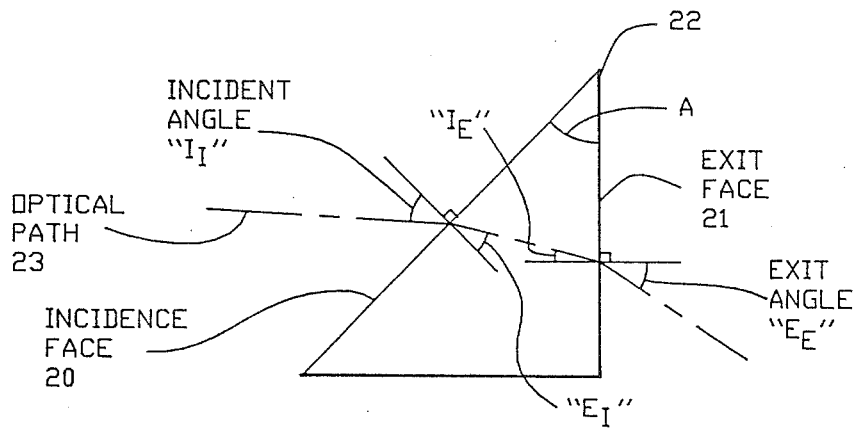

With reference to FIGS. 2A and 2B, the geometry of the prisms utilized in prism beam expanders is set out.

FIGS. 3A, 3B, 4 and 5 illustrate alternative embodiments of 6 prism, high magnification, achromatic PBEs having nearly collinear input and output.

Figure 3A:
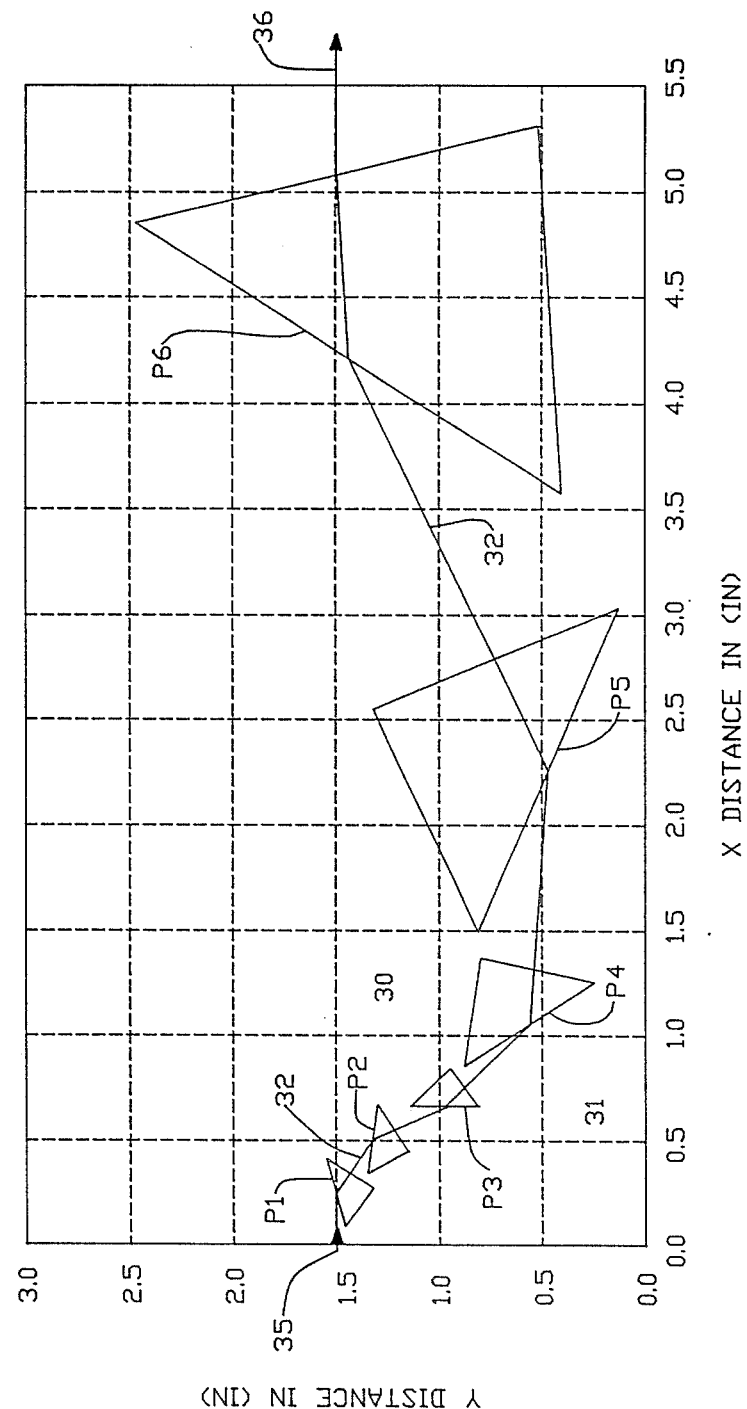
FIG. 3A is a diagram of a first prism beam expander with 6 prisms according to the present invention.
Figure 4:
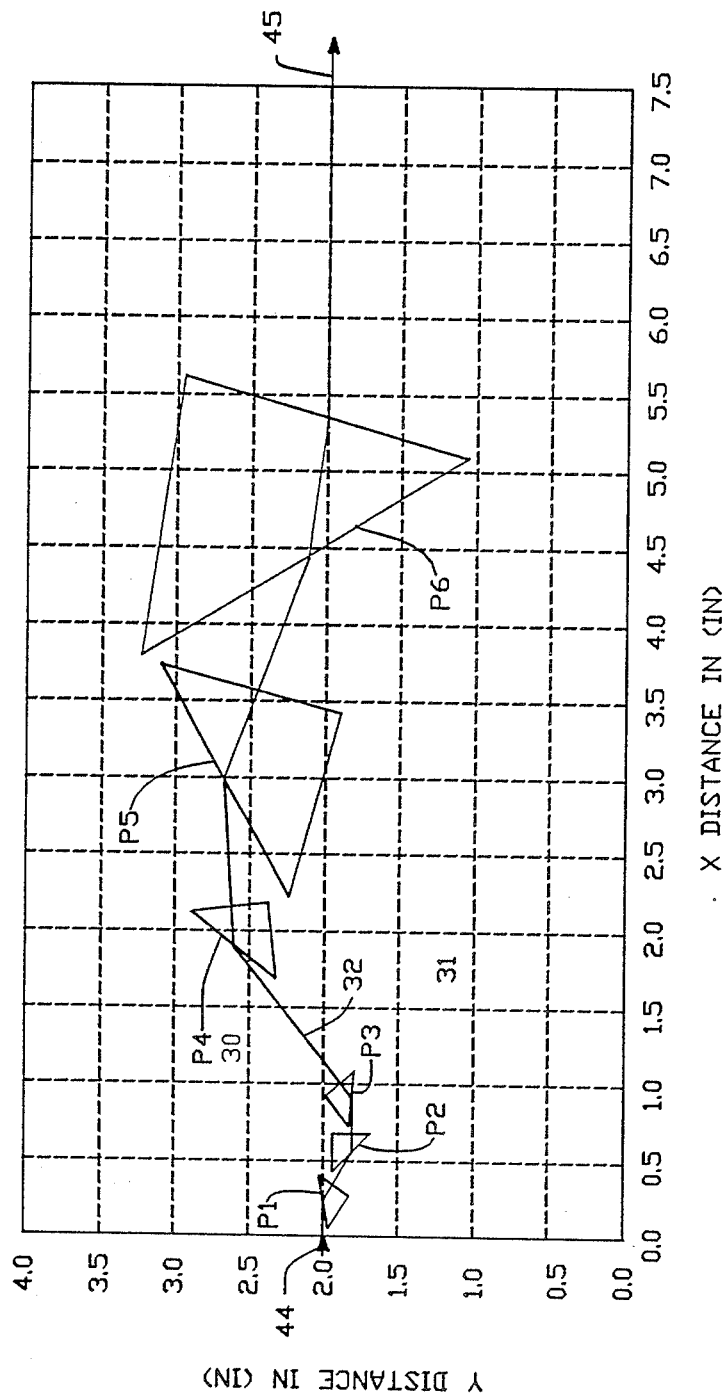
FIG. 4 is a diagram of a second prism beam expander with 6 prisms according to the present invention.
Figure 5:
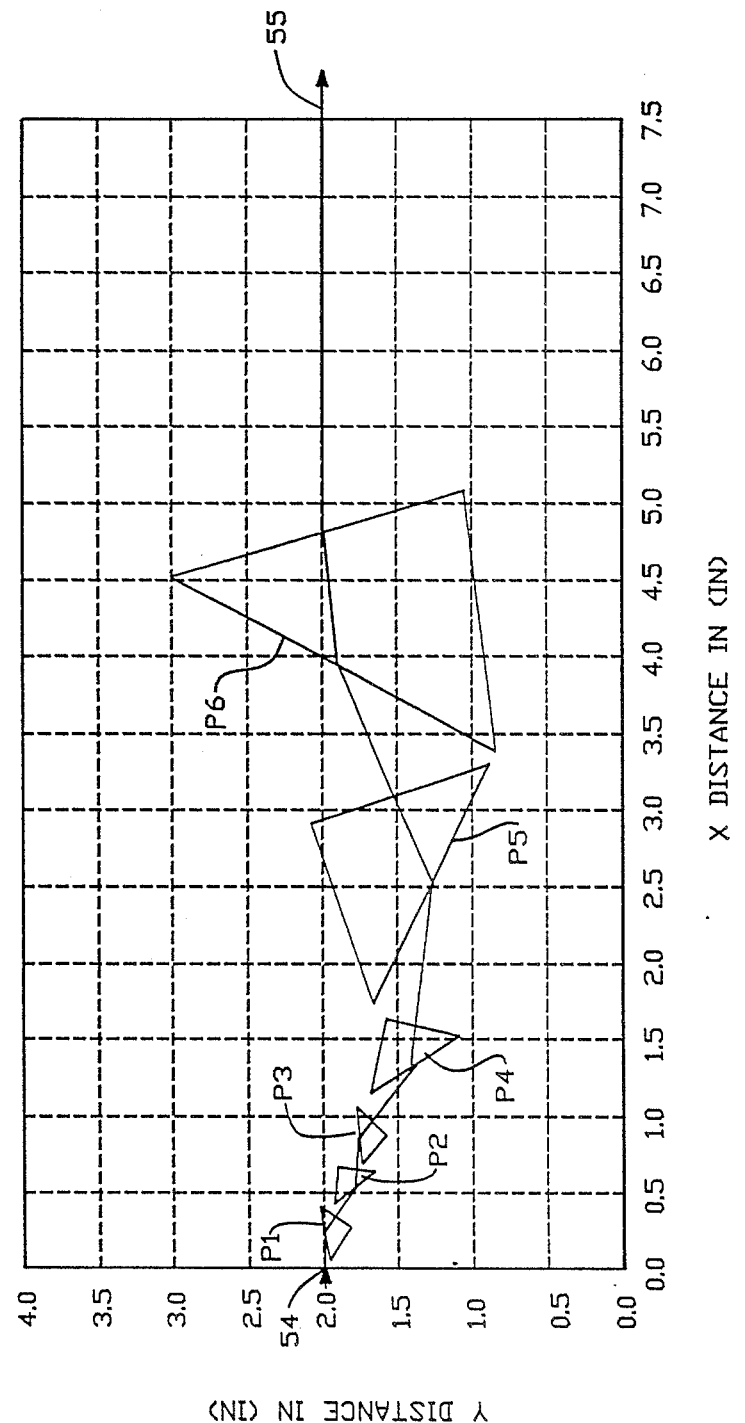
FIG. 5 is a diagram of a third prism beam expander with 6 prisms according to the present invention.
Figure 6:
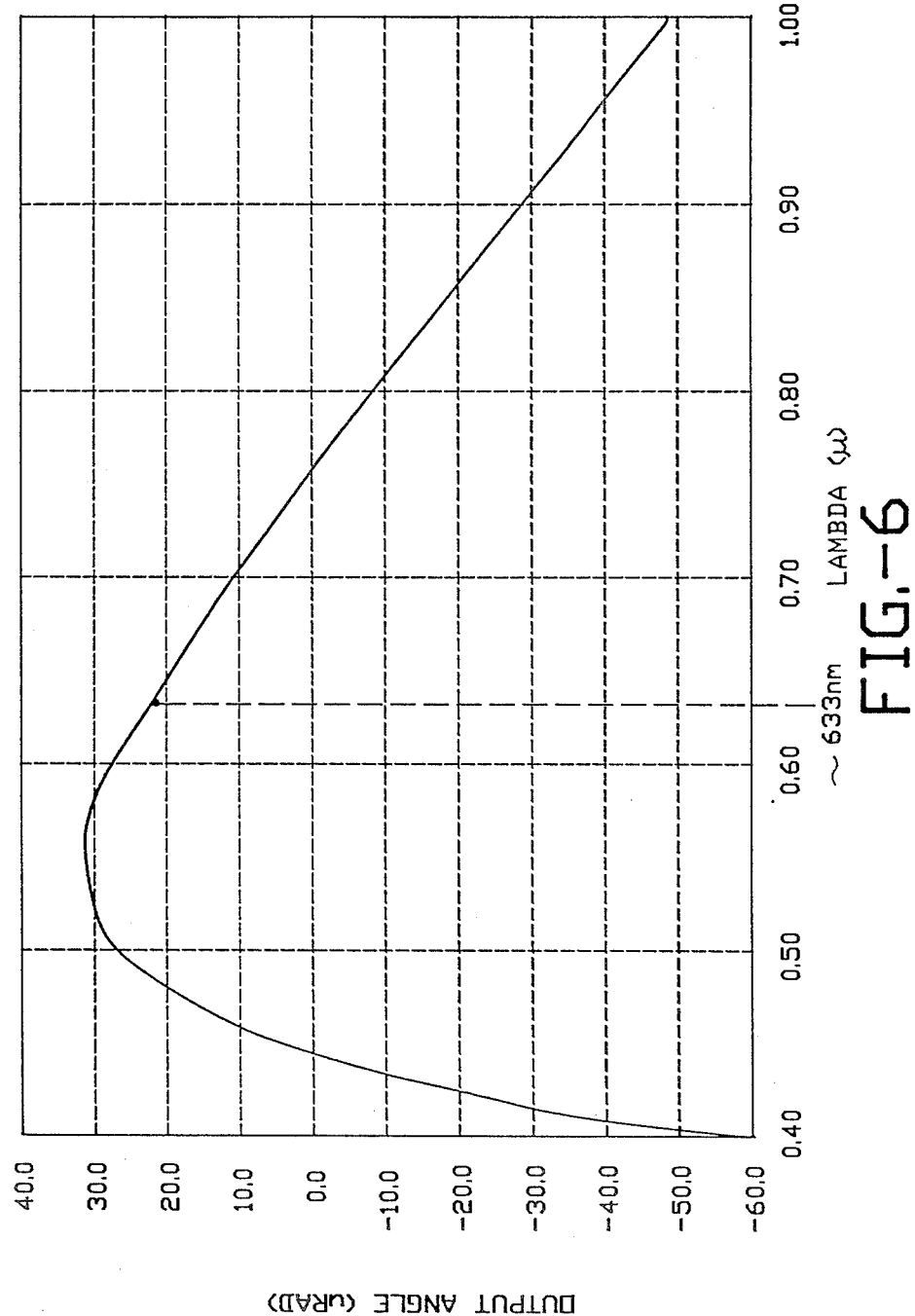
FIG. 6 is a graph of the output angle versus wavelength for the prism beam expander of FIG. 3A.
Figure 7:
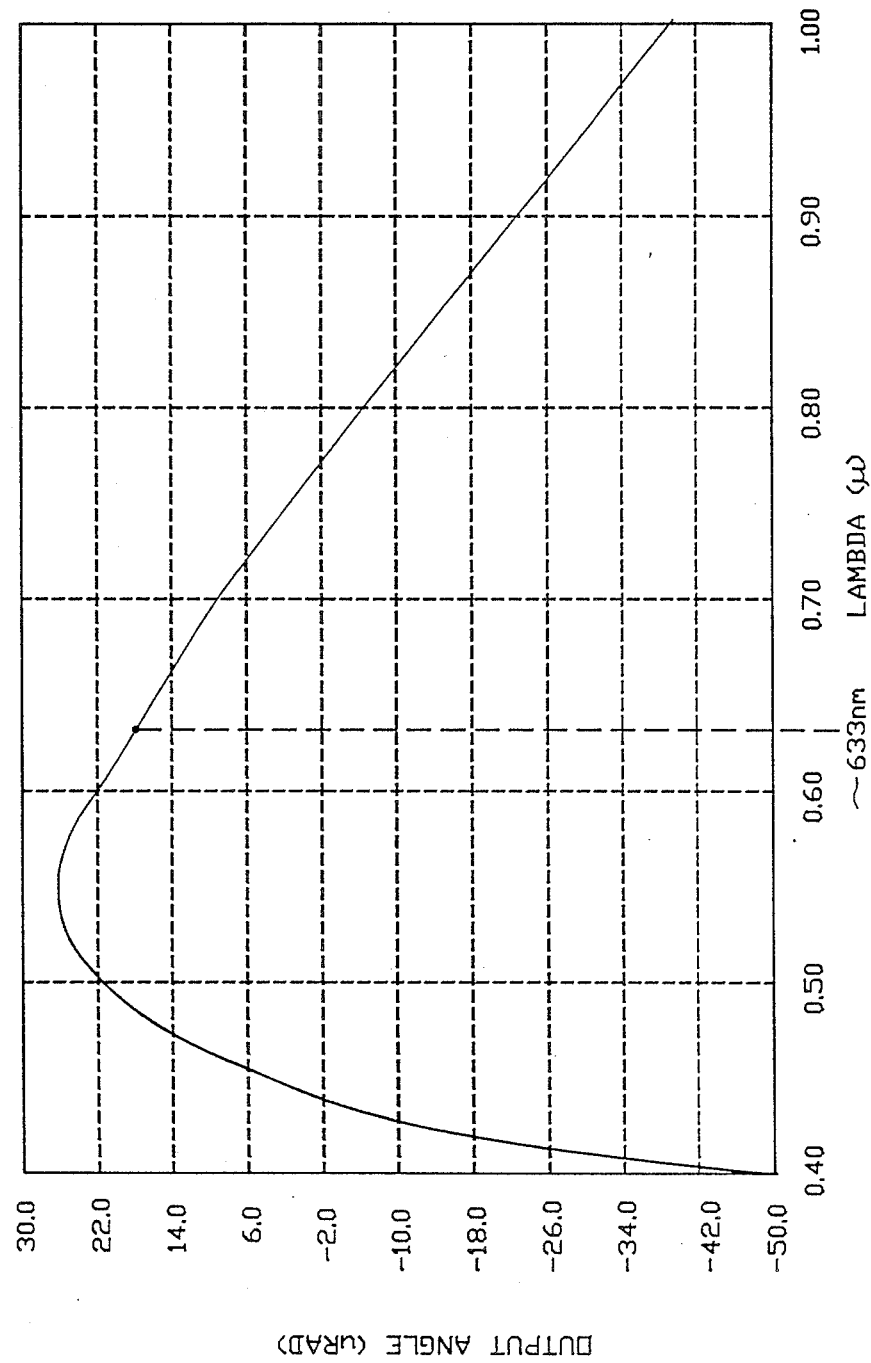
FIG. 7 is a graph of output angle versus wavelength for the prism beam expander of FIG. 4.
Figure 8:
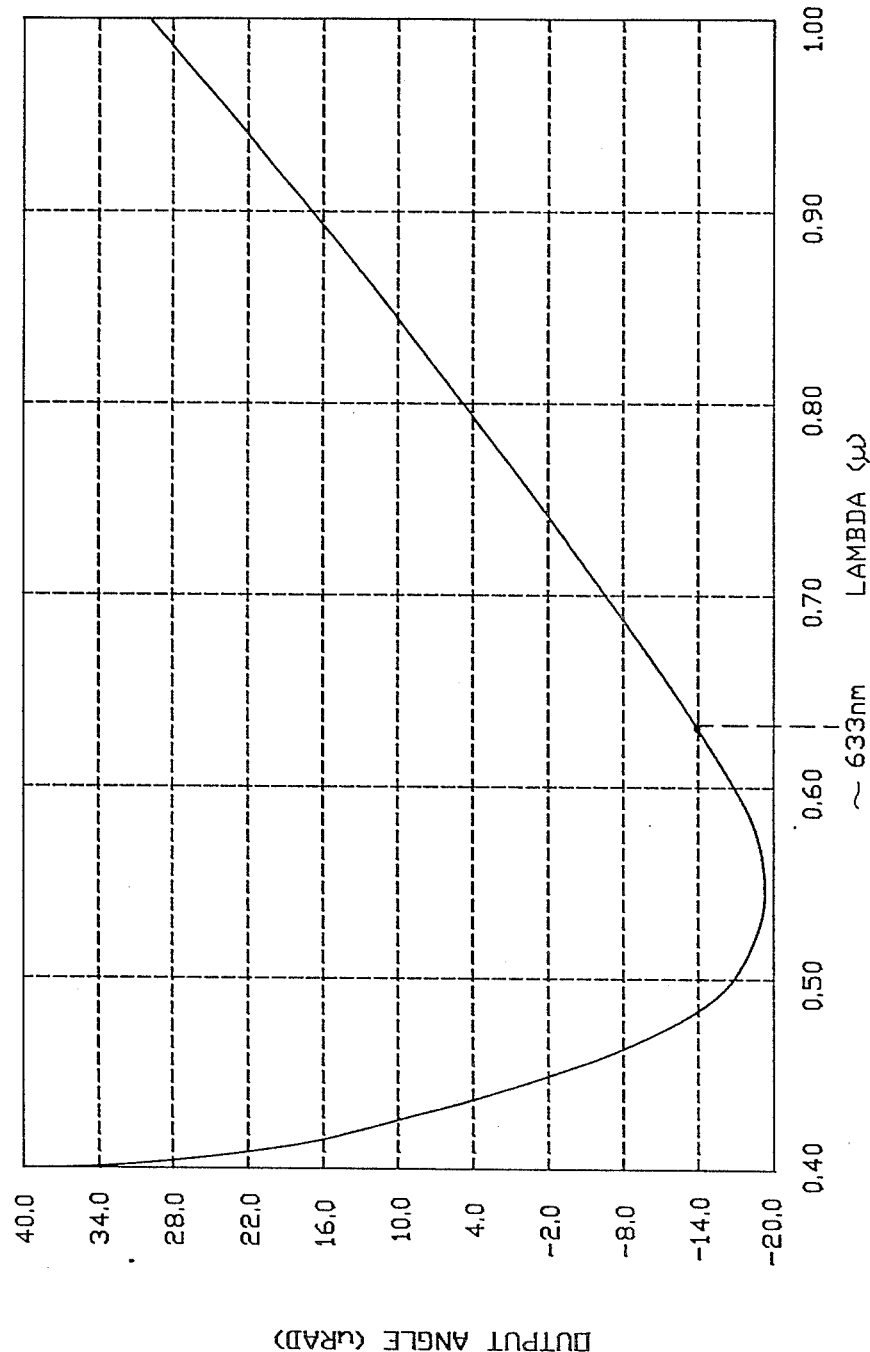
FIG. 8 is a graph of output angle versus wavelength for the prism beam expander of FIG. 5.

FIGS. 6, 7 and 8 illustrate the achromaticity of the prism beam expanders of FIGS. 3A, 4 and 5 respectively.

FIG. 1 illustrates a dye laser 10 which comprises a grating 11, a prism beam expander 12 with a magnification of 500 times, a dye cell 13, and an output coupler 14, all mounted on laser base 5. The optical path 15 within the laser 10 establishes laser oscillation between the grating 11 and the output coupler 14 through the dye cell 13. The dye cell 13 is pumped using a pump laser, flash lamps or other pumping media (not shown) as known in the art. The prism beam expander expands the laser beam in the dimension perpendicular to lines in the grating 11 by 500 times. Thus, as illustrated in Fig. 1, the beam will enter the prism beam expander on a first side 16 about 0.1 mm high. When the beam exits the second side 17 of the prism beam expander, it will be on the order of 50 mm high as illustrated by the hatched region. In this manner, a very large number of lines in the grating 11 take part in the diffraction of the beam and a narrow linewidth is achieved.

Because the laser 10 is a tunable dye laser, it is important that the prism beam expander 12 be achromatic. The angle of incidence of the beam on the grating 11 is adjusted during tuning of the laser using a sine drive mechanism as is known in the art. The very high magnification prism beam expander allows use of a grating that is 4" long in a direction perpendicular to the lines in the grating and ⅜ wide. The substrate holding the grating is a "zerodur" substrate one-half of an inch thick. This substrate has a very low thermal expansion and is otherwise very stable so that the entire length of the grating can be beneficially used in diffraction of the beam.

The grating is formed so that the reflections of the 4th, 5th and 6th orders take place at very high efficiencies. The grating has a 54° blaze angle, and 600 lines per millimeter for the dye application illustrated operating in the visible range.

It is found that using an achromatic prism beam expander with magnifications greater than 100 times, very narrow line widths can be achieved according to the present invention. Furthermore, manufacturing ease is accomplished by achieving nearly collinear input and output of the beam passing through the expander.

In describing the implementation of the preferred embodiments of the present invention, FIGS. 2A and 2B illustrate the geometry of the prisms. FIG. 2A is a perspective view of a prism having an apex angle A of 45°. The prism includes an incidence face 20 and an exit face 21 which intersect at an apex 22. The angle between the incidence face 20 and the exit face 21 defines the apex angle A.

The optical path through the prism of FIG. 2A is illustrated in FIG. 2B. FIG. 2B is a cross-sectional view of a prism, taken perpendicular to the apex 22. An optical path 23 is incident upon the incidence face 20 and exits the prism on the exit face 21. The angle between the optical path 23 and the line perpendicular to the incidence face 20 is defined as the incident angle $I_I$. The optical path 23 makes an angle $E_I$ internal to the prism with the line perpendicular to the incidence face 20. The optical path 23 intersects the exit face 21 at an angle $I_E$ with the line perpendicular to the exit face 21 internal to the prism and exits the prism at an angle $E_E$ with the line perpendicular to the exit face 21. A laser beam along the optical path 23 will be magnified by a factor M as determined by the following equation: $M = (\cos E_I / \cos I_I)(\cos E_E / \cos I_E)$. Thus it can be seen that the magnification M is greater when the incident angle $I_I$ is large and the exit angle $E_E$ is small. However, transmission of the beam suffers as the incidence angle $I_I$ increases as is known in the art. Also, a single prism is chromatic so that in any prism beam expander, at least one prism must be aligned to offset the chromaticity of other prisms in the PBE as described by the Trebino reference cited above.

Figure 3B:
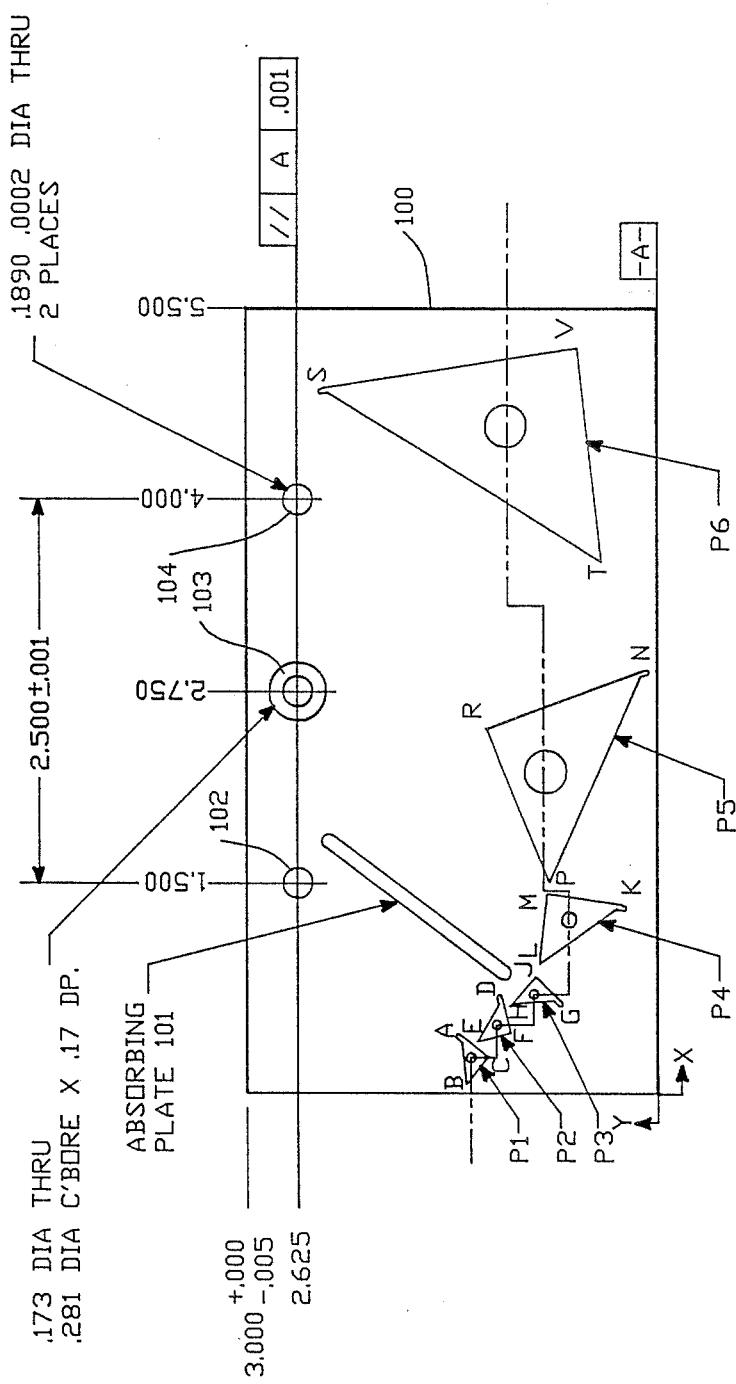
FIG. 3B is a drawing of a mounting plate for the PBE of FIG. 3A.

The preferred embodiment of the prism beam expander according to the present invention is illustrated in FIGS. 3A and 3B. In this prism beam expander, six prisms P1, P2, P3, P4, P5 and P6 are utilized. Each prism has an apex angle of 45°. the apexes of the prisms are essentially parallel and oriented on a first side 30 (labelled U) or a second side 31 (labelled D) of the optical path 32. The prism beam expander illustrated in FIG. 3A has 6 prisms oriented in the U U D D D U configuration.

The incident angles for the prisms P1 through P6 are illustrated in the following table:

| Prism | U/D | Incident Angle $I_I$ |
| --- | --- | --- |
| P1 | U | −79.204 |
| P2 | U | −78.912 |
| P3 | D | 76.702 |
| P4 | D | 74.848 |
| P5 | D | 70.193 |
| P6 | U | −60.169 |

The prisms are formed with an anti-reflective coating on the exit face to achieve high transmission where the angle $I_E$ is small. There is no coating on the incidence face of the prisms in order to allow for a substantial transmission over a wide range of wavelength necessary for the tunable laser application. Such faces could be coated for systems requiring higher transmission of a certain range of wavelengths. Although it is not critical, it is preferable to avoid precisely zero degree $I_E$ angles while maintaining the high magnification so that unwanted oscillator cavities are not set up in the laser.

The apex angles of the prisms are preferred in the range of 30° to 45°. Incident angles and orientations of the apexes with regard to the optical path are calculated using well known optical cavity models to maximize transmission, minimized achromaticity error and achieve near collinearity. It is found that transmissions of greater than 40% are sufficient for very narrow linewidths in tunable dye lasers because losses at the grating and other elements in the optical cavity are of the same order. Greater transmission in these circumstances does not substantially improve the performance of the laser.

The prisms in the configuration of FIG. 3A are mounted within the laser cavity of Fig. 1 on an aluminum plate 100 as illustrated in FIG. 3B. for each prism P1 through P6, a triangular area is milled with a 0.0625 diameter cutter within which the prisms sit. Over travel is permitted at the back corner A, D, G, K, N, and S as indicated in the figures. The precise position of the corners of the triangular areas is set out in the following table.

| 6 Prism Beam Expander Magnification = 500 X-Y Coordinates of Prism Corners | |
| --- | --- |
| Data for Prism P1 | |
| Back Corner A — X = 0.4161 in. | Y = 1.5317 in. |
| Face Corner B — X = 0.0888 in. | Y = 1.4693 in. |
| Base Corner C — X = 0.2755 in. | Y = 1.3249 in. |
| Hypotenuse Angle = 10.80 deg | |
| Data for Prism P2 | |
| Back Corner D — X = 0.6855 in. | Y = 1.2040 in. |
| Face Corner E — X = 0.3885 in. | Y = 1.3549 in. |
| Base Corner F — X = 0.4479 in. | Y = 1.1264 in. |
| Hypotenuse Angle = −26.92 deg | |
| Data for Prism P3 | |
| Back Corner G — X = 0.6282 in. | Y = 0.7649 in. |
| Face Corner H — X = 0.6230 in. | Y = 1.0980 in. |
| Base Corner J — X = 0.8022 in. | Y = 0.9444 in. |
| Hypotenuse Angle = −89.09 deg | |
| Data for Prism P4 | |
| Back Corner K — X = 1.2774 in. | Y = 0.2633 in. |
| Face Corner L — X = 0.8466 in. | Y = 0.8726 in. |
| Base Corner M — X = 1.3721 in. | Y = 0.8152 in. |
| Hypotenuse Angle = −54.74 deg | |
| Data for Prism P5 | |
| Back Corner N — X = 3.0203 in. | Y = 0.1227 in. |
| Face Corner P — X = 1.4914 in. | Y = 0.8171 in. |
| Base Corner R — X = 2.5775 in. | Y = 1.3024 in. |
| Hypotenuse Angle = −24.43 deg | |
| Data for Prism P6 | |
| Back Corner S — X = 4.8635 in. | Y = 2.4801 in. |
| Face Corner T — X = 3.5369 in. | Y = 0.4076 in. |
| Base Corner V — X = 5.2922 in. | Y = 0.5266 in. |
| Hypotenuse Angle = 57.38 deg | |

The positions of the corners for prisms P4, P5, P6 are milled within a tolerance of ±0.001″. The position of prism P1, P2 and P3 are milled within a tolerance of ±0.0004″. The areas are 0.030″ deep. The hypotenuse angle listed for each of the prisms is the angle that the hypotenuse of the triangle defining the prism position makes with the horizontal line B—B through FIG. 3B.

An absorbing plate 101 is mounted on the base plate 100 for absorbing reflected light from the PBE. Three alignment holes 102, 103, 104 are milled at the positions indicated in the figure and at center highly parallel with the base A of the plate 100.

This base plate can be aligned precisely within a laser cavity using well known techniques.

The ease of alignment is enhanced by providing the nearly collinear inputs and outputs of the laser beam. As illustrated in FIG. 3A, a beam at a wavelength of 633 nanometers entering the prism beam expander at the point 35 in the direction indicated by the arrow at an angle of 0.00 microradians with respect to the X-axis, will exit the prism expander at the point 36 at an angle of 22.700 microradians. The beam center will be shifted in the Y direction from 1.5000 inches at point 35 to 1.5034 inches at point 36. Accordingly it can be seen that the input segment at point 35 and the output segment at the point 36 of the beam are nearly collinear.

The transmission is 45.75% at 633 nm. The prism material is fused silica such as Corning 7940 glass, readily available from commercial sources, in the preferred system operating in the visible range. But other materials matched to the wavelengths of a particular laser can be utilized.

FIG. 6 illustrates the output angle in microradians versus wavelength lamba in microns of light passing through the prism beam expander FIG. 3A. It can be seen that the prism beam expander of FIG. 3A is essentially achromatic across the range of 400 to 1000 nanometers such that the absolute value of the output angle is less than 60 microradians. At 633 nanometers, the output angle is 22.7 microradians.

An alternative system is illustrated in FIG. 4. The prism beam expander of FIG. 4 includes 6 prisms P1, P2, P3, P4, P5 and P6. These prisms are oriented so that the apexes of P1, P4 and P5 are on the first side 30 of the optical path 32, and the apexes of prisms P2, P3, P6 are on the second side 31 of the optical path 32. Thus using the U D label, this prism beam expander is in the U D D U U D configuration.

The incident angles are illustrated in the following table:

| Prism | U/D | Incident Angle $I_I$ |
| --- | --- | --- |
| P1 | U | −77.155 |
| P2 | D | 79.854 |
| P3 | D | 79.700 |
| P4 | U | −77.337 |
| P5 | U | −64.828 |
| P6 | D | 54.787 |

The transmission is 41.47%. The incident beam at 633 nanometers at point 44 enters at 2.000″ in the Y direction and 0.000 microradians with the X axis leaves the prism beam expander at 2.0006 inches in the Y direction at point 45 with an output angle of −14.353 microradians. The magnification of this prism beam expander is again 500 times. Apex angles of all prisms are of 45°.

FIG. 7 is a graph of output angle and microradians versus wavelength lamba in microns for the prism beam expander in FIG. 4. Again, it is seen that the output over the visible range of 400 nanometers to 1000 nanometers is essentially achromatic, with the absolute value of the output angle less than 50 microradians over the entire range.

FIG. 5 illustrates yet another embodiment of a 6 prism, achromatic beam expander providing 500 times magnification. This system P1, P2, P3, P4, P5 and P6 are aligned in a U D U D D U configuration with respect to the optical path. The incident angles are set out in the following table:

| Prism | U/D | Incident Angle $I_I$ |
| --- | --- | --- |
| P1 | U | −79.864 |
| P2 | D | 75.911 |
| P3 | U | −79.850 |
| P4 | D | 76.550 |
| P5 | D | 68.181 |
| P6 | U | −55.145 |

The input beam at 633 nanometers is incident on the point 54 at 2.0000 inches in the Y direction and 0.000 microradians with the X axis. It exits the prism beam expander at point 55 at 2.0002 inches in the Y direction and 19.077 microradians with the X axis.

All apex angles are 45°. The transmission is 42.73%.

FIG. 8 is a graph of output angle in microradians versus wavelength lamba in microns for the prism beam expander of FIG. 5. It can be seen that the prism beam expander of FIG. 5 is essentially achromatic over the visible wavelength of 400 to 1000 nanometers, with the absolute value of the output angle less than 40 microradians over the entire range. At 633 nanometers, the output angle is −14.353 microradians.

Other configurations of prisms can be utilized with magnifications greater than 100 and collinear inputs and outputs within ±5° while maintaining achromaticity. It is found that for the high magnifications achieved according to the present invention, in a six prism expander at least two of the apexes should be oriented on a first side of the optical path while at least two of the remaining prisms are oriented on the second side.

In summary, it has been demonstrated that prism beam expanders can be implemented according to the present invention with very high magnification while maintaining achromaticity and nearly collinear inputs and outputs. No prior art system suggests that the results presented here could be achieved with prism beam expanders. Furthermore, a tunable laser with very narrow linewidths is achieved according to the present invention using a very high magnification prism beam expander in conjunction with a diffraction grating.

The foregoing description of the preferred embodiments of the present invention has been presented for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention in its practical application, thereby enabling others skilled in the art to understand the invention for the various embodiments and with various modifications as are suited to the particular use contemplated. It is intended that the scope of the invention be defined by the following claims and their equivalents.

I claim:

1. An apparatus comprising:
a plurality of prisms, all of the prisms in the plurality having an apex at which a plane defined by an incidence side of the prism and a plane defined by an exit side of the prism intersect at an apex angle;
means for securing the plurality of prisms to define an optical path, so that a laser beam in a first segment of the optical path entering the incidence side of a first prism in the plurality in a second segment of the optical path; and wherein
the laser beam in the second segment is expanded after passing through the plurality of prisms with respect to the laser beam in the first segment by more than 100 times in one dimension.

2. The apparatus of claim 1, wherein the first segment and the second segment are nearly collinear.

3. The apparatus of claim 1, wherein there are at least six prisms in the plurality, and the apexes of the plurality of prisms of prisms are essentially parallel and oriented on a first side of the optical path or a second side of the optical path, and wherein at least two of the apexes are oriented on the first side and two of the apexes are oriented on the second side.

4. The apparatus of claim 1, wherein the laser beam in the second segment is expanded in the one dimension at least 500 times.

5. The apparatus of claim 1, wherein the first segment of the optical path is at a first angle and the second segment of the optical path is at a second angle range of ±60 microradians of the first angle for a laser beam having a wavelength in a prespecified range.

6. The apparatus of claim 1, wherein the transmission of the apparatus exceeds 40%.

7. An apparatus comprising:
a plurality of prisms, all of the prisms in the plurality having an apex at which a plane defined by an incidence side of the prism and a plane defined by an exit side of the prism intersect at an apex angle;
means for securing the plurality of prisms to define an optical path, so that a laser beam in a first segment of the optical path entering the incidence side of a first prism in the plurality exits the exit side of a last prism in the plurality in a second segment of the optical path; and wherein
the laser beam in the second segment is contracted after passing through the plurality of prisms with respect to the laser beam in the first segment by more than 100 times in one dimension.

8. The apparatus of claim 7, wherein the first segment and the second segment are nearly collinear.

9. The apparatus of claim 7, wherein there are at least six prisms in the plurality, and the apexes of the plurality of prisms are essentially parallel and oriented on a first side of the optical path or a second side of the optical path, and wherein at least two of the apexes are oriented on the first side and two of the apexes are oriented on the second side.

10. The apparatus of claim 7, wherein the laser beam in the second segment is contracted in the one dimension at least 500 times.

11. The apparatus of claim 7, wherein the first segment of the optical path is at a first angle and the second segment of the optical path is at a second angle that falls within a range of ±60 microradians of the first angle for a laser beam having a wavelength in a prespecified range.

12. The apparatus of claim 7, wherein the transmission of the apparatus exceeds 40%.

* * * * *